(12) United States Patent
Beck et al.

(10) Patent No.: US 9,377,086 B2
(45) Date of Patent: Jun. 28, 2016

(54) MULTI-STAGE TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/435,956

(22) PCT Filed: Sep. 4, 2013

(86) PCT No.: PCT/EP2013/068234
§ 371 (c)(1),
(2) Date: Apr. 15, 2015

(87) PCT Pub. No.: WO2014/060141
PCT Pub. Date: Apr. 24, 2014

(65) Prior Publication Data
US 2015/0267782 A1    Sep. 24, 2015

(30) Foreign Application Priority Data

Oct. 15, 2012  (DE) .......................... 10 2012 218 687

(51) Int. Cl.
*F16H 3/62* (2006.01)
*F16H 3/66* (2006.01)

(52) U.S. Cl.
CPC .......... *F16H 3/66* (2013.01); *F16H 2200/0065* (2013.01); *F16H 2200/2012* (2013.01); *F16H 2200/2046* (2013.01); *F16H 2200/2094* (2013.01)

(58) Field of Classification Search
None
See application file for complete search history.

(56) References Cited

U.S. PATENT DOCUMENTS 7,163,484 B2 * 1/2007 Klemen .................... F16H 3/66
475/276
7,285,069 B2 * 10/2007 Klemen .................... F16H 3/66
475/275

(Continued)

FOREIGN PATENT DOCUMENTS

DE  102009020442  11/2010
DE  102009028670  2/2011

OTHER PUBLICATIONS

International Search Report—(English Translation) PCT/EP2013/068234, dated Nov. 11, 2013. (3 pages).

(Continued)

*Primary Examiner* — Dirk Wright
(74) *Attorney, Agent, or Firm* — Dority & Manning, P.A.

(57) ABSTRACT

The multi-speed transmission comprises four planetary gear sets, eight rotating shafts and six shifting elements, whereas the sun gear of the first planetary gear set is connected to the fifth shaft, which is connectable to the input shaft through a first clutch and is attachable to a housing through a third brake, whereas the drive shaft is, through a second clutch, connectable to the seventh shaft connected to the bar of the fourth planetary gear set and the ring gear of the third planetary gear set and is connected to the sun gear of the second planetary gear set, whereas the sixth shaft is connected to the ring gear of the first planetary gear set, the bar of the second planetary gear set and the ring gear of the fourth planetary gear set and the third shaft is connected to the sun gear of the third planetary gear set and the sun gear of the fourth planetary gear set, and is attachable to the housing through a first brake, whereas the fourth shaft is connected to the bar of the first planetary gear set, is attachable to the housing through a second brake and, through a third clutch, is detachably connectable to the eighth shaft connected to the ring gear of the second planetary gear set and whereas the output shaft of the transmission is connected to the bar of the third planetary gear set.

16 Claims, 1 Drawing Sheet

(56) References Cited

U.S. PATENT DOCUMENTS

| | | | |
|---|---|---|---|
| 7,614,975 B2* | 11/2009 | Seo | F16H 3/66 475/278 |
| 8,517,885 B2* | 8/2013 | Shim | F16H 3/66 475/276 |
| 8,702,555 B1* | 4/2014 | Hart | F16H 3/66 475/278 |
| 2015/0080168 A1* | 3/2015 | Beck | F16H 3/66 475/278 |
| 2015/0087471 A1* | 3/2015 | Beck | F16H 3/66 475/278 |
| 2015/0087472 A1* | 3/2015 | Beck | F16H 3/66 475/278 |
| 2015/0111689 A1* | 4/2015 | Beck | F16H 3/66 475/278 |
| 2015/0126325 A1* | 5/2015 | Beck | F16H 3/66 475/278 |
| 2015/0141195 A1* | 5/2015 | Beck | F16H 3/66 475/278 |
| 2016/0040757 A1* | 2/2016 | Beck | F16H 3/66 475/278 |
| 2016/0084353 A1* | 3/2016 | Beck | F16H 3/66 475/278 |

OTHER PUBLICATIONS

German International Search Report Application No. 102012218687.5, dated Nov. 13, 2012. 5 pages).

* cited by examiner

| Gear | Closed shifting elements | | | | | | Transmission Ratio | Gear Jump |
|---|---|---|---|---|---|---|---|---|
| | Brake | | Clutch | | | | | |
| | 03 | 04 | 05 | 15 | 17 | 48 | | φ |
| 1 | x | x | | | | x | 4,651 | 1,762 |
| 2 | x | | x | | | x | 2,639 | 1,475 |
| 3 | x | | | x | | x | 1,789 | 1,362 |
| 4 | x | | | | x | x | 1,314 | 1,314 |
| 5 | | | | x | x | x | 1,000 | 1,213 |
| 6 | | | x | | x | x | 0,825 | 1,160 |
| 7 | | x | | | x | x | 0,711 | 1,180 |
| 8 | | x | x | | x | | 0,603 | 1,168 |
| 9 | | x | | x | x | | 0,516 | Total |
| R | x | x | | x | | | -4,232 | 9,016 |
| M | x | x | | | x | | 1,314 | |
| M | x | | | x | x | | 1,314 | |
| M | x | | x | | x | | 1,314 | |

MULTI-STAGE TRANSMISSION

FIELD OF INVENTION

The present invention relates generally to a multi-speed transmission in planetary design, in particular an automatic transmission for a motor vehicle.

BACKGROUND

According to the state of the art, automatic transmissions, in particular for motor vehicles, comprise planetary gear sets that are shifted by means of friction elements or shifting elements and are typically connected to a start-up element that is subject to a slip effect and is alternatively provided with a lock-up clutch, such as a hydrodynamic torque converter or a fluid clutch.

Such an automatic transmission is known, for example, from DE 199 12 480 B4 of the applicant. It comprises three single-bar planetary gear sets along with three brakes and two clutches for the shifting of six forward gears and one reverse gear, one drive shaft and one output shaft, whereas the bar of the first planetary gear set is constantly connected to the ring gear of the second planetary gear set and the bar of the second planetary gear set is constantly connected to the ring gear of the third planetary gear set and the drive shaft is connected to the sun gear of the second planetary gear set.

In addition, it is provided with the known transmission that the drive shaft is connectable through the first clutch to the sun gear of the first planetary gear set and through the second clutch to the bar of the first planetary gear set, whereas the sun gear of the first planetary gear set is connectable through the first brake to a housing of the transmission and the bar of the first planetary gear set is connectable through the second brake to the housing of the transmission, whereas the sun gear of the third planetary gear set is connectable through the third brake to the housing of the transmission. The output shaft of the transmission is constantly connected to the bar of the third planetary gear set and the ring gear of the first planetary gear set.

A 9-gear multi-speed transmission is also known from DE 29 36 969 A1; it comprises eight shifting elements and four planetary gear sets, whereas one planetary gear set is used as an upstream transmission and the main transmission features a Simpson set and an additional planetary gear set used as a reversing gear.

Additional multi-speed transmissions are known, for example, from DE 10 2005 010 210 A1 and DE 10 2006 006 637 A1 of the applicant.

In general, automatically shiftable vehicle transmissions in planetary design are already described in the state of the art, and are subject to continuous development and improvement. Thus, such transmissions should require low construction costs, in particular a small number of shifting elements, and, upon a sequential shifting operation, should avoid double gearshifts, i.e. the switching on and/or off of two or more shifting elements such that, during gearshifts in defined gear groups, only one shifting element is changed.

A multi-speed transmission in planetary design is known from DE 10 2008 000 428 A1 of the applicant; this features an input and an output, which are arranged in a housing. With the known transmission, at least four planetary gear sets, hereinafter referred to as the first, second, third and fourth planetary gear sets, at least eight rotatable shafts—hereinafter referred to as the input shaft, output shaft, third, fourth, fifth, sixth, seventh and eighth shafts—along with at least six shifting elements, comprising brakes and clutches, are provided; their selective meshing brings about different transmission ratio relationships between the input and the output, such that, preferably, nine forward gears and one reverse gear can be realized.

Thereby, the first and the second planetary gear sets, which are preferably formed as negative planetary gear sets, thus with a negative stationary transmission ratio, a shiftable upstream gear set, whereas the third and the fourth planetary gear sets form a main gear set.

With the known multi-speed transmissions, it is provided that the bars of the first and the second planetary gear set are coupled to each other through the fourth shaft, which is connected to one element of the main gear set that the ring gear of the first planetary gear set is coupled to the sun gear of the second planetary gear set through the eighth shaft, which is detachably connectable to the drive shaft through a first clutch and that the sun gear of the first planetary gear set is attachable to the housing of the transmission by means of the third shaft through a first brake, and is detachably connected to the drive shaft through a second clutch, whereas the ring gear of the second planetary gear set is attachable to a housing of the transmission by means of the fifth shaft through a second brake. In addition, the seventh shaft is constantly connected to at least one element of the main gear set and is attachable to the housing of the transmission through a third brake, whereas the sixth shaft is constantly connected to at least one additional element of the main gear set and is detachably connectable to the drive shaft through a third clutch; the output shaft is constantly connected to at least one additional element of the main gear set.

Preferably, with the known transmission, the fourth shaft is constantly connected to the ring gear of the third planetary gear set, whereas the sixth shaft is constantly connected to the ring gear of the fourth planetary gear set and the bar of the third planetary gear set, and is detachably connectable to the drive shaft through the third clutch. In addition, the seventh shaft is constantly connected to the sun gears of the third and fourth planetary gear set, and is attachable to a housing of the transmission through the third brake. Thereby, the output takes place through the output shaft constantly connected to the bar of the fourth planetary gear set. Furthermore, the third and the fourth planetary gear set can be assembled or reduced to a Ravigneaux set with a common bar and a common ring gear.

According to the state of the art, the shifting elements of the multi-stage transmissions designed in such a manner, which are typically designed as multi-disk clutches or brakes, are hydraulically actuated, which feature high hydraulic losses in a disadvantageous manner. In order to avoid these actuating losses, the use of actuated shifting elements that are in line with demand would be particularly advantageous.

With "shifting elements in line with demand," shifting elements that, no energy or less energy to maintain their shifting state than upon the change to the shifting state are particularly understood.

In order to enable the use of actuatable shifting elements in line with demand, the shifting elements, in particular the clutches, should be easily accessible from the outside.

SUMMARY OF THE INVENTION

The present subject matter is directed to a multi-speed transmission, which features nine forward gears and one reverse gear and a sufficient transmission ratio, for which the construction costs, the component load and the component size are optimized, and which also improves efficiency. Moreover, the shifting elements of the transmission may be easily accessible from the outside, by which the installation of actuatable shifting elements in line with demand is made possible. In addition, the transmission is suitable for both standard design and a front-transverse design.

Accordingly, a multi-speed transmission in planetary design in accordance with exemplary aspects of the invention is proposed, which features an input and an output, and is arranged in a housing. Furthermore, at least four planetary gear sets, hereafter referred to as the first, second, third and fourth planetary gear set, eight rotatable shafts—hereinafter referred to as the input shaft, output shaft, third, fourth, fifth, sixth, seventh and eighth shafts—along with six shifting elements preferably designed as multi-disk shifting elements or as positive-locking shifting elements, comprising brakes and clutches, are provided; their selective actuation or meshing brings about different transmission ratio relationships between the input and the output, such that, preferably, nine forward gears and one reverse gear can be realized.

The planetary gear sets of the transmission are preferably formed as negative planetary gear sets.

As is well-known, a simple negative planetary gear set comprises a sun gear, a ring gear and a carrier or bar, on which the planetary gears are rotatably mounted, each of which meshes with the sun gear and the ring gear. Thereby, with a carrier or bar that is held down, the ring gear exhibits a direction of rotation opposite to the sun gear. By contrast, a simple positive planetary gear set comprises a sun gear, a ring gear and a carrier or bar, on which the inner and outer planetary gears are rotatably mounted, whereas all inner planetary gears mesh with the sun gear, and all outer planetary gears mesh with the ring gear, whereas each inner planetary gear meshes with each outer planetary gear. Thereby, with a carrier or bar that is held down, the ring gear exhibits the same direction of rotation as the sun gear, and a positive stationary transmission ratio arises.

In accordance with a first exemplary embodiment of the invention, the sun gear of the first planetary gear set is connected to the fifth shaft, which is detachably connectable to the drive shaft through a first clutch and is attachable to the housing through a third brake, whereas the drive shaft is, through a second clutch, detachably connectable to the seventh shaft connected to the carrier or bar of the fourth planetary gear set and the ring gear of the third planetary gear set and whereas the drive shaft is connected to the sun gear of the second planetary gear set.

Furthermore, the sixth shaft is connected to the ring gear of the first planetary gear set, the carrier or bar of the second planetary gear set and the ring gear of the fourth planetary gear set, whereas the third shaft is connected to the sun gear of the third planetary gear set and the sun gear of the fourth planetary gear set, and is attachable to the housing through a first brake.

In addition, the fourth shaft is connected to the carrier or bar of the first planetary gear set, is attachable to the housing through a second brake and, through a third clutch, is detachably connectable to the eighth shaft connected to the ring gear of the second planetary gear set, whereas the output shaft of the transmission is connected to the carrier or bar of the third planetary gear set.

Within the framework of an additional exemplary embodiment of the invention, the sun gear of the first planetary gear set is connected to the fifth shaft, which is detachably connectable to the drive shaft through a first clutch and is attachable to the housing through a third brake, whereas the drive shaft is, through a second clutch, detachably connectable to the seventh shaft connected to the carrier or bar of the fourth planetary gear set and the ring gear of the third planetary gear set, and whereas the drive shaft is connected to the sun gear of the second planetary gear set.

Furthermore, the sixth shaft is connected to the ring gear of the first planetary gear set and the ring gear of the fourth planetary gear set and is, through a third clutch, detachably connectable to the eighth shaft connected to the carrier or bar of the second planetary gear set, whereas the third shaft is connected to the sun gear of the third planetary gear set and the sun gear of the fourth planetary gear set, and is attachable to the housing through a first brake.

In addition, the fourth shaft is connected to the carrier or bar of the first planetary gear set and the ring gear of the second planetary gear set, and is attachable to the housing through a second brake, whereas the output shaft of the transmission is connected to the carrier or bar of the third planetary gear set.

Given the fact that the first and second clutches are arranged on the input shaft of the transmission, three additional shifting elements are designed as brakes and the third clutch is, viewed radially, arranged near the housing, the easy accessibility of all shifting elements of the transmission is ensured, by which the shifting elements can be designed as actuated shifting elements in line with demand. Within the framework of additional embodiments, shifting elements of the transmission may be designed as, among other things, hydraulically actuated shifting elements.

Furthermore, transmission ratios particularly suitable for passenger cars along with an increased overall spread of the multi-speed transmission arise, which results in an improvement in driving comfort and a significant reduction in consumption.

Moreover, with the multi-speed transmission in accordance with exemplary aspects of the invention, construction costs are significantly reduced, due to the low number of shifting elements. In an advantageous manner, with the multi-speed transmission in accordance with exemplary aspects of the invention, it is possible to perform a start with a hydrodynamic converter, an external starting clutch or other suitable external start-up elements. It is also possible to enable the start-up procedure with a start-up element integrated into the transmission. A shifting element that is actuated in the first forward gear and in the reverse gear is preferably suitable.

Furthermore, the multi-speed transmission in accordance with exemplary aspects of the invention gives rise to good efficiency in the main driving gears with respect to drag losses and gearing losses.

In an advantageous manner, there are low torques on the shifting elements and on the planetary gear sets of the multi-speed transmission, which reduces the wear for the multi-speed transmission in an advantageous manner. In addition, the low torques enable correspondingly low dimensioning, which reduces the required installation space and the corresponding costs. Furthermore, there are also low rotational speeds for the shafts, the shifting elements and the planetary gear sets.

In addition, the transmission in accordance with exemplary aspects of the invention is designed in such a manner that adaptability to the various drive train arrangements is enabled, both in the direction of the power flow and in spatial terms.

Additional objectives and advantages of the invention set will be set forth in part in the following description, or may be obvious from the description, or may be learned through practice of the invention.

BRIEF DESCRIPTION OF THE DRAWINGS

In the following, the invention is more specifically illustrated as an example on the basis of the attached Figures. The following are shown in these.

DETAILED DESCRIPTION

Figures 1, 2:
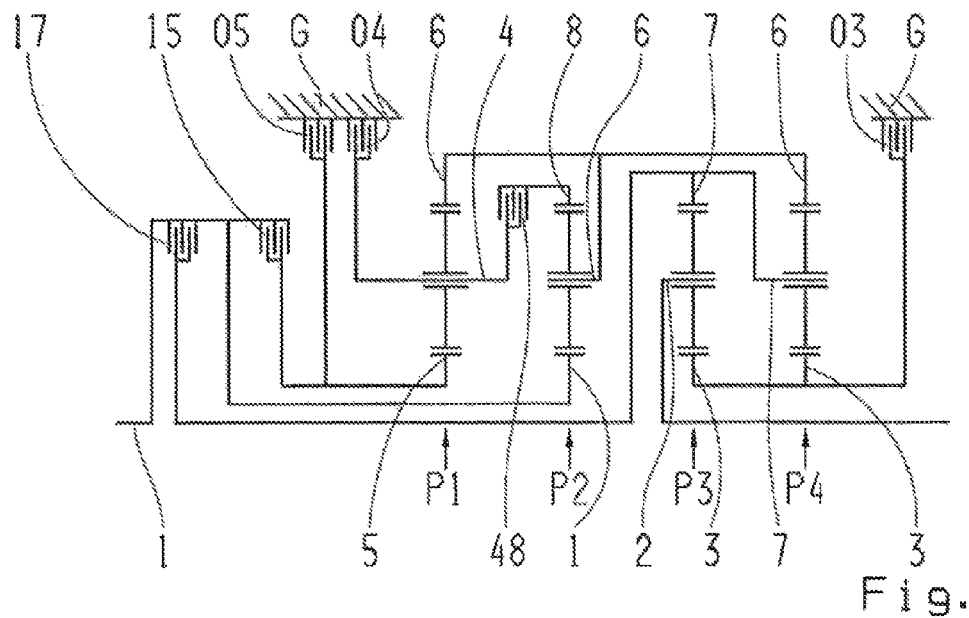
FIG. 1: a schematic view of a preferred exemplary embodiment of a multi-speed transmission in accordance with the invention.
FIG. 2: an exemplary shifting diagram for a multi-speed transmission in accordance with FIG. 1.

Reference will now be made to embodiments of the invention, one of more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a multi-speed transmission in accordance with exemplary aspects of the invention with an input shaft 1, an output shaft 2 and four planetary gear sets P1, P2, P3 and P4, which are arranged in a housing G. In the example shown in FIG. 1, the planetary gear sets P1, P2, P3, P4 are formed as negative planetary gear sets. In accordance with exemplary aspects of the invention, at least one of the planetary gear sets P1, P2, P3, P4 may be designed as a positive planetary gear set, if, at the same time, the carrier or bar connection and the ring gear connection are exchanged, and the amount of the stationary transmission ratio is increased by 1 compared to the design as a negative planetary gear set.

With the embodiment that is shown, the planetary gear sets P1, P2, P3, P4 are arranged, viewed axially, in the order of the first planetary gear set P1, the second planetary gear set P2, the third planetary gear set P3, the fourth planetary gear set P4. In accordance with exemplary aspects of the invention, the axial order of the individual planetary gear sets and the arrangement of the shifting elements are freely selectable, as long as this allows for the binding ability of the elements.

As shown in FIG. 1, six shifting elements (i.e., three brakes 03, 04, 05 and three clutches 15, 17, 48) are provided. The spatial arrangement of the shifting elements may be arbitrary, and is limited only by the dimensions and the external shaping. The clutches and brakes of the transmission are preferably designed as frictional shifting elements or multi-disk shifting elements, but may also be designed as positive-locking shifting elements.

With these shifting elements, a selective shifting of nine forward gears and one reverse gear can be realized. The multi-speed transmission in accordance with exemplary aspects of the invention features a total of eight rotating shafts, namely the shafts 1, 2, 3, 4, 5, 6, 7 and 8, whereas the input shaft forms the first shaft 1 and the output shaft forms the second shaft 2 of the transmission.

In accordance with exemplary aspects of the invention, with the multi-speed transmission in accordance with FIG. 1, it is provided that the sun gear of the first planetary gear set P1 is connected to the fifth shaft 5, which is detachably connectable to the drive shaft 1 through a first clutch 15 and is attachable to the housing G through a third brake 05, whereas the drive shaft 1 is, through a second clutch 17, detachably connectable to the seventh shaft 7 connected to the carrier or bar of the fourth planetary gear set P4 and the ring gear of the third planetary gear set P3, and is connected to the sun gear of the second planetary gear set P2.

As shown in FIG. 1, the sixth shaft 6 is connected to the ring gear of the first planetary gear set P1, the carrier or bar of the second planetary gear set P2 and the ring gear of the fourth planetary gear set P4, whereas the third shaft 3 is connected to the sun gear of the third planetary gear set P3 and the sun gear of the fourth planetary gear set P4, and is attachable to the housing G through a first brake 03.

In addition, the fourth shaft 4 is connected to the carrier or bar of the first planetary gear set P1, is attachable to the housing G through the second brake 04 and is, through a third clutch 48, detachably connectable to the eighth shaft 8 connected to the ring gear of the second planetary gear set P2, whereas the output shaft 2 of the transmission is connected to the carrier or bar of the third planetary gear set P3.

Thereby, the first and second clutches 15, 17 may be arranged next to each other (viewed axially), may be designed as multi-disk shifting elements and may feature a common outer multi-disk carrier. With the embodiment shown, the first brake 03 is particularly suitable for a design as a claw shifting element, by which consumption is significantly improved.

FIG. 2 shows an exemplary shifting diagram of a multi-speed transmission in accordance with FIG. 1. For each gear, three shifting elements are locked. As an example, the respective transmission ratios i of the individual gears and the gear steps or progressive steps φ, to be determined from these, for the next higher gear can be seen in the shift diagram, whereas the value 9.016 represents the spread of the transmission.

For the example shown, the values for the stationary transmission ratios of the planetary gear sets P1, P2, P3, P4 designed as negative planetary gear sets are −2,366, −1,600, −3,189 and −2,763, respectively. FIG. 2 shows that, upon a sequential shifting operation, only one shifting element must be switched on, and only one shifting element must be switched off, since two adjacent gears jointly use two shifting elements. It also shows that a large spread is achieved with small gear jumps.

The first forward gear arises through the locking of the first and second brakes 03, 04 and the third clutch 48, the second forward gear arises through the locking of the first and third brakes 03, 05 and the third clutch 48, the third forward gear arises through the locking of the first brake 03 and the first and third clutches 15, 48, the fourth forward gear arises through the locking of the first brake 03 and the second and third clutches 17, 48, the fifth forward gear, which in the example shown is designed as a direct gear, arises through the locking of the first, second and third clutches 15, 17, 48, the sixth forward gear arises through the locking of the third brake 05 and the second and third clutches 17, 48, the seventh forward gear arises through the locking of the second brake 04 and the second and third clutches 17, 48, the eighth forward gear arises through the locking of the second and third brakes 04, 05 and the second clutch 17 and the ninth forward gear arises through the locking of the second brake 04 and the first and second clutches 15, 17, whereas the reverse gear arises through the locking of the first and second brakes 03, 04 and the first clutch 15.

Alternatively, the fourth forward gear may be shifted by other shifting combinations, which are referred to with M in FIG. 2. Accordingly, the fourth forward gear may arise through the locking of the first and second brakes 03, 04 and the second clutch 17, or through the locking of the first brake 03 and the first and second clutches 15, 17, or through the locking of the first and third brakes 03, 05 and the second clutch 17.

Given the fact that the first and second brake 03, 04, the first and third clutch 15, 48 are locked in the first forward gear and/or reverse gear, such shifting elements may be used as start-up elements.

In accordance with exemplary aspects of the invention, even with the same transmission scheme, different gear jumps arise depending on the shifting logic, such that an application-specific or vehicle-specific variation is enabled.

In accordance with exemplary aspects of the invention, it is also optionally possible to provide additional freewheels at each suitable location of the multi-speed transmission, for example between one shaft and the housing, or, if applicable, in order to connect two shafts.

An axle differential and/or a distributor differential may be arranged on the input side or on the output side.

Within the framework of an advantageous additional exemplary form of the invention, if necessary, the input shaft 1 may be separated from the drive motor by a clutch element, whereas a hydrodynamic converter, a hydraulic clutch, a dry starting clutch, a wet starting clutch, a magnetic powder clutch or a centrifugal clutch or the like may be used as the clutch element. It is also possible to arrange such a start-up element in the direction of the power flow behind the transmission, whereas, in this case, the input shaft 1 is constantly connected to the crankshaft of the drive motor.

The multi-speed transmission in accordance with exemplary aspects of the invention also allows for the arrangement of a torsional vibration damper between the drive motor and the transmission.

Within the framework of an additional exemplary embodiment of the invention that is not shown, a wear-free brake, such as a hydraulic retarder or an electric retarder or the like, may be arranged at each shaft, preferably at the input shaft 1 or the output shaft 2; this is of particular importance for use in commercial vehicles. Furthermore, a power take-off may be provided to drive of additional power units at each shaft, preferably at the input shaft 1 or the output shaft 2.

The frictional shifting elements that are used may be formed as power-shiftable clutches or brakes. In particular, force-fitting clutches or brakes, such as multi-disk clutches, band brakes and/or cone clutches, may be used.

An additional advantage of the multi-speed transmission presented here is that an electric motor can be installed at each shaft as a generator and/or as an additional drive motor.

REFERENCE SIGNS

1 First shaft, drive shaft
2 Second shaft, output shaft
3 Third shaft
4 Fourth shaft
5 Fifth shaft
6 Sixth shaft
7 Seventh shaft
8 Eighth shaft
3 First brake
4 Second brake
5 Third brake
15 First clutch
17 Second clutch
48 Third clutch
G Housing
P1 First planetary gear set
P2 Second planetary gear set
P3 Third planetary gear set
P4 Fourth planetary gear set
i Transmission ratio
φ Progressive step

The invention claimed is:

1. An automatic transmission, comprising
a housing;
a plurality of shafts including a drive shaft, an output shaft, a third shaft, a fourth shaft, a fifth shaft, a sixth shaft, a seventh shaft and an eight shaft;
a plurality of planetary gear sets disposed within the housing, the plurality of planetary gear sets including a first planetary gear set, a second planetary gear set, a third planetary gear set and a fourth planetary gear set, a sun gear of the first planetary gear set connected to the fifth shaft, a ring gear of the first planetary gear set connected the sixth shaft, a carrier of the first planetary gear set connected to the fourth shaft, a sun gear of the second planetary gear set connected the drive shaft, a ring gear of the second planetary gear set connected to the eighth shaft, a carrier of the second planetary gear set connected to the sixth shaft, a sun gear of the third planetary gear set connected to the third shaft, a ring gear of the third planetary gear set connected to the seventh shaft, a carrier of the third planetary gear set connected to the output shaft, a sun gear of the fourth planetary gear set connected to the third shaft, a ring gear of the fourth planetary gear set connected to the sixth shaft, a carrier of the fourth planetary gear set connected to the seventh shaft; and
a plurality of shifting elements including a first brake, a second brake, a third brake, a first clutch, a second clutch and a third clutch, the first brake selectively coupling the third shaft to the housing, the second brake selectively coupling the fourth shaft to the housing, the third brake selectively coupling the fifth shaft to the housing, the first clutch selectively coupling the drive shaft to the fifth shaft, the second clutch selectively coupling the drive shaft to the seventh shaft, the third clutch selectively coupling the fourth shaft to the eighth shaft.

2. The automatic transmission of claim 1, wherein the first planetary gear set, the second planetary gear set, the third planetary gear set and the fourth planetary gear set are negative planetary gear sets.

3. The automatic transmission of claim 1, wherein the plurality of planetary gear sets is axially arranged in the order of the first planetary gear set, the second planetary gear set, the third planetary gear set and the fourth planetary gear set within the housing.

4. The automatic transmission of claim 1, wherein the shifting elements of the plurality of shifting elements are actuated shifting elements in line with demand.

5. The automatic transmission of claim 1, wherein at least one of the first brake or the third clutch is a positive-locking shifting element.

6. The automatic transmission of claim 1, wherein: the first brake, the second brake and the third clutch are closed in a first forward gear; the first brake, the third brake and the third clutch are closed in a second forward gear; the first brake, the first clutch and the third clutch are closed in a third forward gear; the first brake, the second clutch and the third clutch are closed in a fourth forward gear; the first clutch, the second clutch and the third clutch are closed in a fifth forward gear; the third brake, the second clutch and the third clutch are closed in a sixth forward gear; the second brake, the second clutch and the third clutch are closed in a seventh forward gear; the second brake, the third brake and the third clutch are closed in a eighth forward gear; and the second brake, the first clutch and the second clutch are closed in a ninth forward gear.

7. The automatic transmission of claim 6, the first brake, the second brake and the first clutch are closed in a reverse gear.

8. The automatic transmission of claim 6, wherein the fourth forward gear also corresponds to at least one of following configurations:
   a first configuration wherein the first brake, the second brake and the second clutch are closed;
   a second configuration wherein the first brake, the first clutch and the second clutch are closed; or
   a third configuration wherein the first brake, the third brake and the second clutch are closed.

9. An automatic transmission, comprising
   a drive shaft;
   an output shaft;
   a housing;
   a plurality of planetary gear sets disposed within the housing, the plurality of planetary gear sets including a first planetary gear set, a second planetary gear set, a third planetary gear set and a fourth planetary gear set, a sun gear of the second planetary gear set connected the drive shaft, a carrier of the third planetary gear set connected to the output shaft, a ring gear of the first planetary gear set connected a carrier of the second planetary gear set and a ring gear of the fourth planetary gear set;
   a plurality of shifting elements including a first brake, a second brake, a third brake, a first clutch, a second clutch and a third clutch, the first brake selectively coupling a sun gear of the third planetary gear set and a sun gear of the fourth planetary gear set to the housing, the second brake selectively coupling a carrier of the first planetary gear set to the housing, the third brake selectively coupling a sun gear of the first planetary gear set to the housing, the first clutch selectively coupling the drive shaft to the sun gear of the first planetary gear set, the second clutch selectively coupling the drive shaft to a ring gear of the third planetary gear set and a carrier of the fourth planetary gear set, the third clutch selectively coupling the carrier of the first planetary gear set to a ring gear of the second planetary gear set.

10. The automatic transmission of claim 9, wherein the first planetary gear set, the second planetary gear set, the third planetary gear set and the fourth planetary gear set are negative planetary gear sets.

11. The automatic transmission of claim 9, wherein the plurality of planetary gear sets is axially arranged in the order of the first planetary gear set, the second planetary gear set, the third planetary gear set and the fourth planetary gear set within the housing.

12. The automatic transmission of claim 9, wherein the shifting elements of the plurality of shifting elements are actuated shifting elements in line with demand.

13. The automatic transmission of claim 9, wherein at least one of the first brake or the third clutch is a positive-locking shifting element.

14. The automatic transmission of claim 9, wherein: the first brake, the second brake and the third clutch are closed in a first forward gear; the first brake, the third brake and the third clutch are closed in a second forward gear; the first brake, the first clutch and the third clutch are closed in a third forward gear; the first brake, the second clutch and the third clutch are closed in a fourth forward gear; the first clutch, the second clutch and the third clutch are closed in a fifth forward gear; the third brake, the second clutch and the third clutch are closed in a sixth forward gear; the second brake, the second clutch and the third clutch are closed in a seventh forward gear; the second brake, the third brake and the third clutch are closed in a eighth forward gear; and the second brake, the first clutch and the second clutch are closed in a ninth forward gear.

15. The automatic transmission of claim 14, the first brake, the second brake and the first clutch are closed in a reverse gear.

16. The automatic transmission of claim 14, wherein the fourth forward gear also corresponds to at least one of following configurations:
   a first configuration wherein the first brake, the second brake and the second clutch are closed;
   a second configuration wherein the first brake, the first clutch and the second clutch are closed; or
   a third configuration wherein the first brake, the third brake and the second clutch are closed.

* * * * *